May 7, 1957  G. W. RICHARDSON  2,791,076
ROOT CROP HARVESTING MACHINES
Filed Aug. 24, 1953  3 Sheets-Sheet 1

Inventor
George Wilfred Richardson
By
Attorneys

United States Patent Office 2,791,076
Patented May 7, 1957

2,791,076

ROOT CROP HARVESTING MACHINES

George Wilfred Richardson, Barrow-on-Humber, County of Lincoln, England, assignor of two-thirds to Thomas Brierley and Alan Courtley, both of Derker, Oldham, England Application August 24, 1953, Serial No. 376,174

2 Claims. (Cl. 55—56)

This invention relates to improvements in tractor drawn root crop harvesting machines for harvesting crops such as sugar beet, mangolds, swedes, carrots and the like.

The object of the invention is a machine for lifting the roots from the ground and such machine in combination with mechanism for severing the tops or foliage from the crop without damage thereto.

According to the invention the machine comprises a frame suitably disposed alongside a tractor and supported at the rear end thereby and by a wheel driven from the tractor, crop lifting tools being mounted on the frame to penetrate the ground, an inclined runway extending from the tools to an arcuate passage, a rotary spinner forming the base of the tunnel to move the crop therethrough and remove earth therefrom and gearing for driving the spinner.

The invention will be described with reference to the accompanying drawings.

Figure 2:
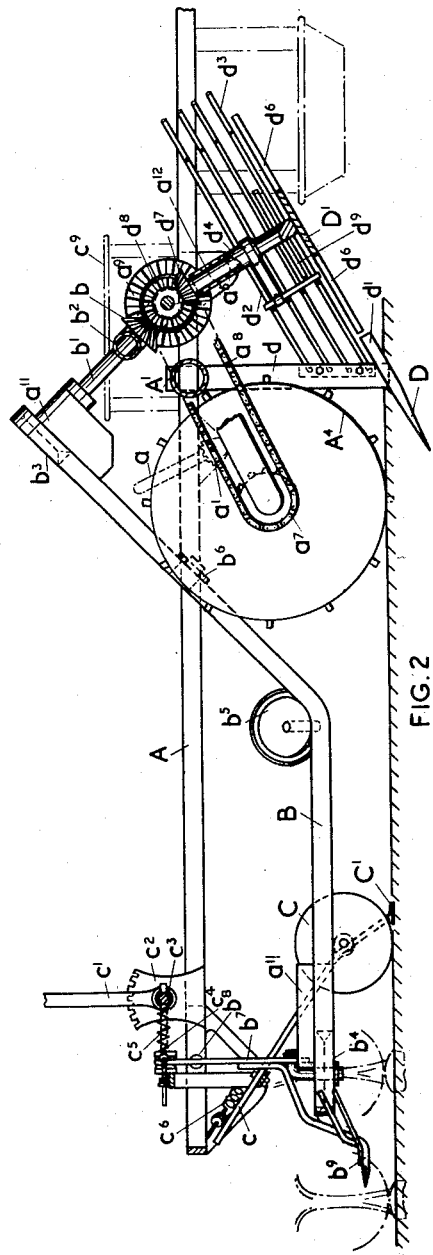
Fig. 2 is a sectional elevation of same primarily on line 2—2 of Fig. 1.
Figure 3:
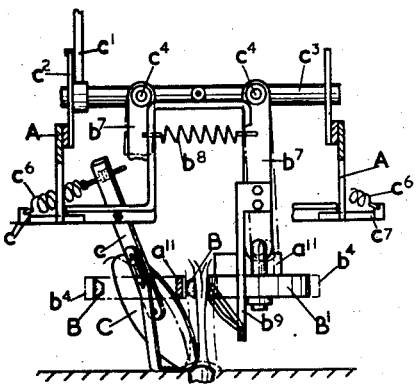
Fig. 3 is a detail front view partly in section of part of the machine.

The machine is constructed with a frame A supported at its rear end by a tubular member $A^1$ extending behind a tractor wheel $A^2$ and affixed to the usual implement attachment on the tractor to be capable of being lifted for transport purposes. The frame is also supported at its rear end by a wheel $A^4$ adjustably mounted on the frame A to allow for variation of the height of the frame. The frame A is conventionally adjustable relatively to the wheel $A^4$ as through a hand lever $a$ shown in long and short dots in Fig. 2 and conventional associated elements (not shown) operating over a notched quadrant $a^1$.

The wheel $A^4$ is driven by sprocket wheels $a^2$, $a^3$ chain $a^4$ a transverse shaft $a^5$ journalled in the frame A, sprocket wheels $a^6$, $a^7$ and chain $a^8$ from the tractor wheel $A^2$ thereby obviating any drag on the tractor due to the frame A being mounted alongside the tractor.

The shaft $a^5$ also carries a pair of bevel wheels $a^9$ driving two bevel pinions $b$ each mounted on a shaft $b^1$ supported in a transverse member $b^2$ on the frame A. A belt pulley $b^3$ is mounted on the upper end of each shaft $b^1$.

Endless belts B, $B^1$ pass over the pulleys $b^3$ and extend to the front end of the frame A to pass around further belt pulleys $b^4$, guide pulleys $b^5$ and tensioning pulleys $b^6$ being mounted on longitudinal members $a^{11}$ on the frame A. The gearing driving the pulleys $b^3$ is arranged to traverse the belts B, $B^1$ in the direction of the arrows Fig. 1 at a speed substantially equal to the forward speed of the tractor whereby the travel of the belts in a direction opposite to that of tractor maintains the belts during this portion of their travel substantially stationary relatively to the ground.

Figure 4:
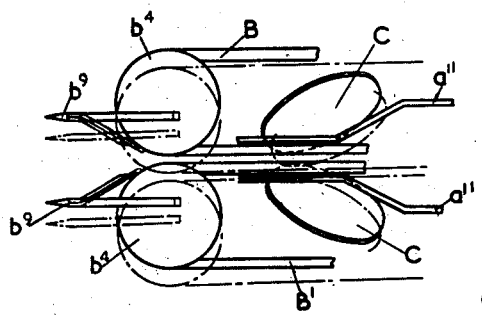
Fig. 4 is a top plan view of the guides.
Figure 5:
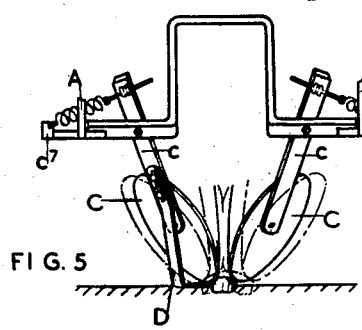
Fig. 5 is a front view of the foliage engaging discs.

The pulleys $b^4$ at the forward end of the frame A are carried on depending arms $b^7$ pivotally mounted on a spindle $c^3$. A spring $b^8$ is attached between the arms $b^7$. Each depending arm $b^7$ also carries a pointed guide arm $b^9$ spaced apart as shown in Figs. 1 and 4.

Figure 1:
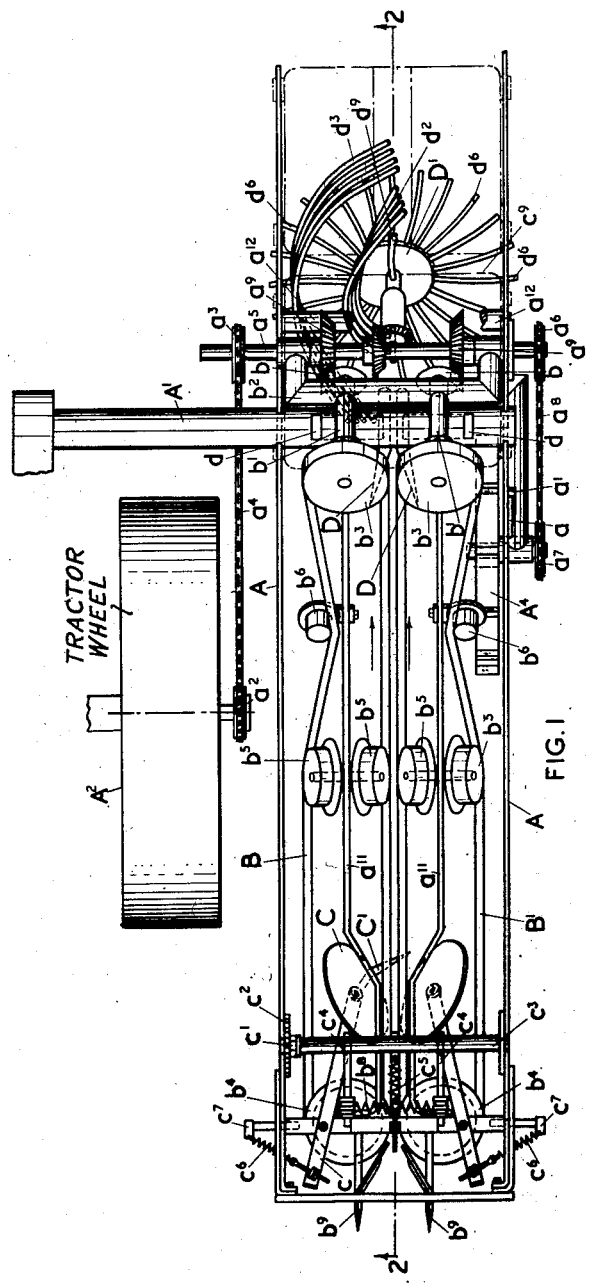
Fig. 1 is a plan of the machine.
Figure 6:
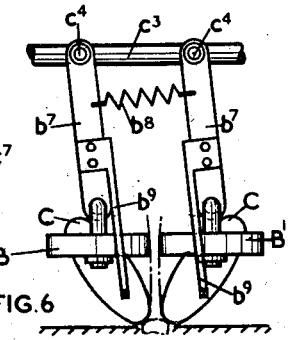
Fig. 6 is a front view of the belt mounting.

The belt pulleys $b^4$ supported on the arms $b^7$ pivoted to the spindle $c^3$ as shown in Figs. 1 and 6 are capable of a vertical adjustable movement through a lever $c^1$ operating over a notched quadrant $c^2$ to rotate the spindle $c^3$ and raise or lower rods $c^4$ carrying the supporting brackets for the pulleys $b^4$. The front end of the frame is supported on discs C capable of adjusting their positions vertically relatively to the ground through a spring $c^5$ to allow the discs C to rise or fall as they engage a beet or other root crop to assume positions such as shown in long and short dots in Fig. 2.

The discs C may also adjust their relative positions horizontally to accommodate themselves laterally, relatively to the crop through springs $c^6$ connected between the free ends of the arms $c$ and arms $c^7$ on the frame A.

The discs C during their rotation may engage the longitudinal members $a^{11}$ on the frame A carrying the belt pulleys $b^4$ or projections on the arms $c$ may engage the members $a^{11}$ whereby the discs C are moved laterally relatively to the frame as they engage a plant.

The guides $b^9$ engage the tops or foliage of each plant and deflect the belt pulleys $b^4$ to bring the belts B, $B^1$ to each side of the tops or foliage which are gripped between the belts. The movement of the belt pulleys $b^4$ causes a transverse movement of the longitudinal members $a^{11}$ which deflect the discs C to allow the discs to engage the portion of the plant projecting above ground level.

A horizontal cutter balde $C^1$ is mounted on one disc carrying arm $c$ to project between the adjacent peripheries of the discs C to sever the tops from the plant in proximity thereto without damage to the root.

The tractor is driven along the line of the crop with the frame A vertically above the line or row. The guides $b^9$ engage the tops or foliage on each side of each plant and move the belts B, $B^1$ and discs C transversely to enable the adjacent portions of the peripheries of the discs to engage and ride up over the root as shown in long and short dots in Fig. 2 in order that the cutter $C^1$ may sever the tops adjacent thereto without damage to the root. The tops or foliage pass between the belts B, $B^1$ and are gripped between the two faces thereof by which they are traversed to the rear end of the frame A whilst occupying a substantially stationary position relatively to the ground to prevent pulling from the root. The tops or foliage are thus maintained out of contact with the ground and therefore are kept free from earth. At the rear end of the frame the tops or foliage are discharged from the belts as these latter pass round the pulleys $b^3$ and deposited on a platform $c^9$ from which they may be delivered to a truck drawn by the tractor, or elsewhere.

Crop lifting tools D are mounted at an inclination on an arm $d$ depending from the tubular mmeber $A^1$, the tool D penetrating the ground to raise the roots which travel up an inclined runway $d^1$ extending from the tools D and into an arcuate tunnel like passage a portion of the sides of which are closed by rods or laths $d^2$ pivoted on the rear of the frame A and enclosed by further rods or laths $d^3$. The raising of the root crop up the runway $d^1$ is assisted by a rotating disc or spinner $D^1$ mounted on an inclined shaft $d^4$ journalled in a rod $a^{12}$ extending transversely of the frame A, curved tines $d^6$ forming the base of the tunnel, radiate from the disc $D^1$ and push the crop into the passage and cause it to turn about itself as the tines rotate which removes earth from the crop, the crop finally emerging from the passage at the rear end thereof to be deposited on a platform or the like.

The shaft $d^4$ is driven by a bevel gear $d^7$ engaging a bevel gear $d^8$ on the transverse shaft $a^5$.

An arm $d^9$ may be mounted on the shaft $d^4$ above the spinner $D^1$ to assist in lifting the crop into the passage.

I claim:

1. A root crop harvesting machine comprising a draft frame, a cross member mounted on the rear of the frame, a driving shaft extending transversely of the frame, arms depending from said cross member, crop lifting tools on the lower ends of said arms to lift the roots from the soil as the frame is advanced, inner and outer vertical sets of curved soil-sifting tines forming the sides of a tunnel at the rear of the frame and operatively associated therewith, said tines extending rearwardly and being terminally free, a rotary spinner having its axis radially inwardly of said tunnel whereby the lifted crop and dirt will travel in a path spaced from said axis, said spinner having a circumferential series of radial tines providing the base of the tunnel and acting to advance the roots through the tunnel by its rotation, and means driven by said shaft for rotating the spinner during the advance of the frame.

2. A root crop harvesting machine comprising a draft frame, a cross member mounted on the rear of the frame, a driving shaft extending transversely of the frame, arms depending from said cross member, crop lifting tools fixed to the lower ends of said arms set at an upward and rearward inclination to lift the roots from the soil as the frame is advanced, inner and outer vertical sets of curved soil-sifting tines forming the sides of a tunnel at the rear of the frame and operatively associated therewith, said tines extending rearwardly and being terminally free, a rotary spinner mounted in rear of the crop lifting tools with its axis radially inwardly of said tunnel whereby the lifted crop and dirt will travel in a path spaced from said axis and for rotation in approximately the same inclined plane with the crop lifting tools, said spinner having a circumferential series of radial tines providing the base of the tunnel and acting to receive the roots from the upper rear ends of the crop lifting tools and to advance the roots through the tunnel and clean the roots through action of the tines, bearing means, an inclined shaft for the spinner journaled in said bearing means geared to the driving shaft extending transversely of the frame to be driven therefrom, the outer vertical set of tines extending rearwardly from one of said arms, and the other set of tines being carried by said bearing means with their front ends spaced rearwardly from said bars.

References Cited in the file of this patent

UNITED STATES PATENTS

| | | |
|---|---|---|
| 2,308,392 | Roepke | Jan. 12, 1943 |
| 2,337,698 | Walz | Dec. 28, 1943 |
| 2,537,118 | Andersen et al. | Jan. 9, 1951 |